United States Patent
Takagi

(10) Patent No.: US 11,902,650 B2
(45) Date of Patent: Feb. 13, 2024

(54) IMAGE CAPTURING APPARATUS, NOTIFICATION APPARATUS, NOTIFICATION METHOD, AND STORAGE MEDIUM

(71) Applicant: CANON KABUSHIKI KAISHA, Tokyo (JP)

(72) Inventor: Shin Takagi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 152 days.

(21) Appl. No.: 16/882,721

(22) Filed: May 25, 2020

(65) Prior Publication Data
US 2020/0382720 A1    Dec. 3, 2020

(30) Foreign Application Priority Data

May 30, 2019  (JP) .................................. 2019-101485

(51) Int. Cl.
*H04N 23/63*       (2023.01)
*H04N 23/60*       (2023.01)
(Continued)

(52) U.S. Cl.
CPC ......... *H04N 23/60* (2023.01); *G06F 18/2431* (2023.01); *G06V 10/764* (2022.01);
(Continued)

(58) Field of Classification Search
CPC ........... H04N 5/232939; G06K 9/6282; G06K 9/6218; G06K 9/6219; G06V 20/10; G06V 20/70
See application file for complete search history.

(56) References Cited

U.S. PATENT DOCUMENTS

| | | | |
|---|---|---|---|
| 2007/0076116 A1* | 4/2007 | Pandit .................. | H04N 23/651 |
| | | | 348/E5.034 |
| 2012/0015672 A1* | 1/2012 | Jung ...................... | G06T 11/00 |
| | | | 455/456.3 |

(Continued)

FOREIGN PATENT DOCUMENTS

| | | |
|---|---|---|
| JP | 2007-304771 A | 11/2007 |
| JP | 2013-135446 A | 7/2013 |

OTHER PUBLICATIONS

S. Haykin, 'Neural Networks: A Comprehensive Foundation', Second Edition, Prentice Hall, Jul. 1998, pp. 156 to 255 Cited in Specification in paragraph [0053].

*Primary Examiner* — Twyler L Haskins
*Assistant Examiner* — Wesley J Chiu
(74) *Attorney, Agent, or Firm* — Cowan, Liebowitz & Latman, P.C.

(57) ABSTRACT

There is provided an image capturing apparatus. A shooting control unit carries out continuous shooting. A detection unit detects, from an image obtained through the continuous shooting, a plurality of object classes. The object classes are organized hierarchically according to a hierarchical structure in which an object class in a higher hierarchy level contains an object class in a lower hierarchy level. A selection unit selects a specific hierarchy level on the basis of a predetermined selection criterion. A notification unit notifies a user of one or more of the plurality of object classes, with priority given to an object class belonging to the specific hierarchy level.

17 Claims, 10 Drawing Sheets

(51) Int. Cl.
*G06V 20/10* (2022.01)
*G06F 18/2431* (2023.01)
*G06V 10/762* (2022.01)
*G06V 10/764* (2022.01)
*G06V 10/82* (2022.01)
*G06V 20/00* (2022.01)
*G06V 20/70* (2022.01)
*H04N 23/69* (2023.01)
*G06V 20/68* (2022.01)

(52) U.S. Cl.
CPC .......... *G06V 10/7625* (2022.01); *G06V 10/82* (2022.01); *G06V 20/00* (2022.01); *G06V 20/10* (2022.01); *G06V 20/70* (2022.01); *H04N 23/633* (2023.01); *H04N 23/69* (2023.01); *G06V 20/68* (2022.01)

(56) References Cited

U.S. PATENT DOCUMENTS

| | | | |
|---|---|---|---|
| 2012/0044153 A1* | 2/2012 | Arrasvuori | G06F 3/04883 345/173 |
| 2013/0088499 A1* | 4/2013 | Sato | G06F 16/9027 345/501 |
| 2014/0359438 A1* | 12/2014 | Matsuki | H04N 5/232127 715/702 |
| 2018/0139405 A1* | 5/2018 | Baek | H04N 21/84 |
| 2018/0192094 A1* | 7/2018 | Barnett | H04N 21/6125 |
| 2019/0102646 A1* | 4/2019 | Redmon | G06V 20/52 |
| 2021/0311545 A1* | 10/2021 | Bae | G06F 3/011 |
| 2021/0312179 A1* | 10/2021 | Lee | G06F 16/5854 |

* cited by examiner

IMAGE CAPTURING APPARATUS, NOTIFICATION APPARATUS, NOTIFICATION METHOD, AND STORAGE MEDIUM

BACKGROUND OF THE INVENTION

Field of the Invention

The present invention relates to an image capturing apparatus, a notification apparatus, a notification method, and a storage medium.

Description of the Related Art

A technique which displays object information of an image on the basis of feature information stored in a storage unit, a technique which classifies types of objects into hierarchy levels and detects types of objects from an image by narrowing down the types hierarchically, and the like are known.

For example, Japanese Patent Laid-Open No. 2013-135446 discloses a technique in which if the name of an object can be identified on the basis of feature information stored in a storage unit, corresponding name information is displayed in a display unit. Furthermore, Japanese Patent Laid-Open No. 2007-304771 discloses a technique in which object conditions identifying object types are classified into hierarchy levels and stored, and the type of an object is detected from an image by narrowing down the types hierarchically.

However, according to the technique disclosed in Japanese Patent Laid-Open No. 2013-135446 described above, a large amount of name information is displayed when many object names have been identified, which makes it difficult to efficiently communicate useful information to a user. On the other hand, according to the technique disclosed in Japanese Patent Laid-Open No. 2007-304771 described above, a recognized object type will correspond to an object condition belonging to a lower hierarchy level, and thus depending on the circumstances, a user may obtain information that is too detailed.

SUMMARY OF THE INVENTION

The present invention has been conceived in light of such circumstances. The present invention provides a technique that, when a plurality of hierarchically-organized object classes have been detected from an image, prioritizes an object class belonging to a hierarchy level selected on the basis of a predetermined selection criterion and then notifies a user of one or more of the plurality of object classes.

According to a first aspect of the present invention, there is provided an image capturing apparatus comprising at least one processor and/or at least one circuit which functions as: a shooting control unit configured to carry out continuous shooting; a detection unit configured to detect, from an image obtained through the continuous shooting, a plurality of object classes, the object classes being organized hierarchically according to a hierarchical structure in which an object class in a higher hierarchy level contains an object class in a lower hierarchy level; a selection unit configured to select a specific hierarchy level on the basis of a predetermined selection criterion; and a notification unit configured to notify a user of one or more of the plurality of object classes, with priority given to an object class belonging to the specific hierarchy level.

According to a second aspect of the present invention, there is provided a notification apparatus comprising at least one processor and/or at least one circuit which functions as: an obtainment unit configured to obtain a plurality of object classes, the object classes having been detected from an image, and being organized hierarchically according to a hierarchical structure in which an object class in a higher hierarchy level contains an object class in a lower hierarchy level; a selection unit configured to select a specific hierarchy level on the basis of a predetermined selection criterion; and a notification unit configured to notify a user of one or more of the plurality of object classes, with priority given to an object class belonging to the specific hierarchy level.

According to a third aspect of the present invention, there is provided a notification method executed by an image capturing apparatus, comprising: carrying out continuous shooting; detecting, from an image obtained through the continuous shooting, a plurality of object classes, the object classes being organized hierarchically according to a hierarchical structure in which an object class in a higher hierarchy level contains an object class in a lower hierarchy level; selecting a specific hierarchy level on the basis of a predetermined selection criterion; and notifying a user of one or more of the plurality of object classes, with priority given to an object class belonging to the specific hierarchy level.

According to a fourth aspect of the present invention, there is provided a notification method executed by a notification apparatus, comprising: obtaining a plurality of object classes, the object classes having been detected from an image, and being organized hierarchically according to a hierarchical structure in which an object class in a higher hierarchy level contains an object class in a lower hierarchy level; selecting a specific hierarchy level on the basis of a predetermined selection criterion; and notifying a user of one or more of the plurality of object classes, with priority given to an object class belonging to the specific hierarchy level.

According to a fifth aspect of the present invention, there is provided a non-transitory computer-readable storage medium which stores a program for causing a computer to execute a notification method comprising: carrying out continuous shooting; detecting, from an image obtained through the continuous shooting, a plurality of object classes, the object classes being organized hierarchically according to a hierarchical structure in which an object class in a higher hierarchy level contains an object class in a lower hierarchy level; selecting a specific hierarchy level on the basis of a predetermined selection criterion; and notifying a user of one or more of the plurality of object classes, with priority given to an object class belonging to the specific hierarchy level.

According to a sixth aspect of the present invention, there is provided a non-transitory computer-readable storage medium which stores a program for causing a computer to execute a notification method comprising: obtaining a plurality of object classes, the object classes having been detected from an image, and being organized hierarchically according to a hierarchical structure in which an object class in a higher hierarchy level contains an object class in a lower hierarchy level; selecting a specific hierarchy level on the basis of a predetermined selection criterion; and notifying a user of one or more of the plurality of object classes, with priority given to an object class belonging to the specific hierarchy level.

Further features of the present invention will become apparent from the following description of exemplary embodiments with reference to the attached drawings.

DESCRIPTION OF THE EMBODIMENTS

Figure 1:
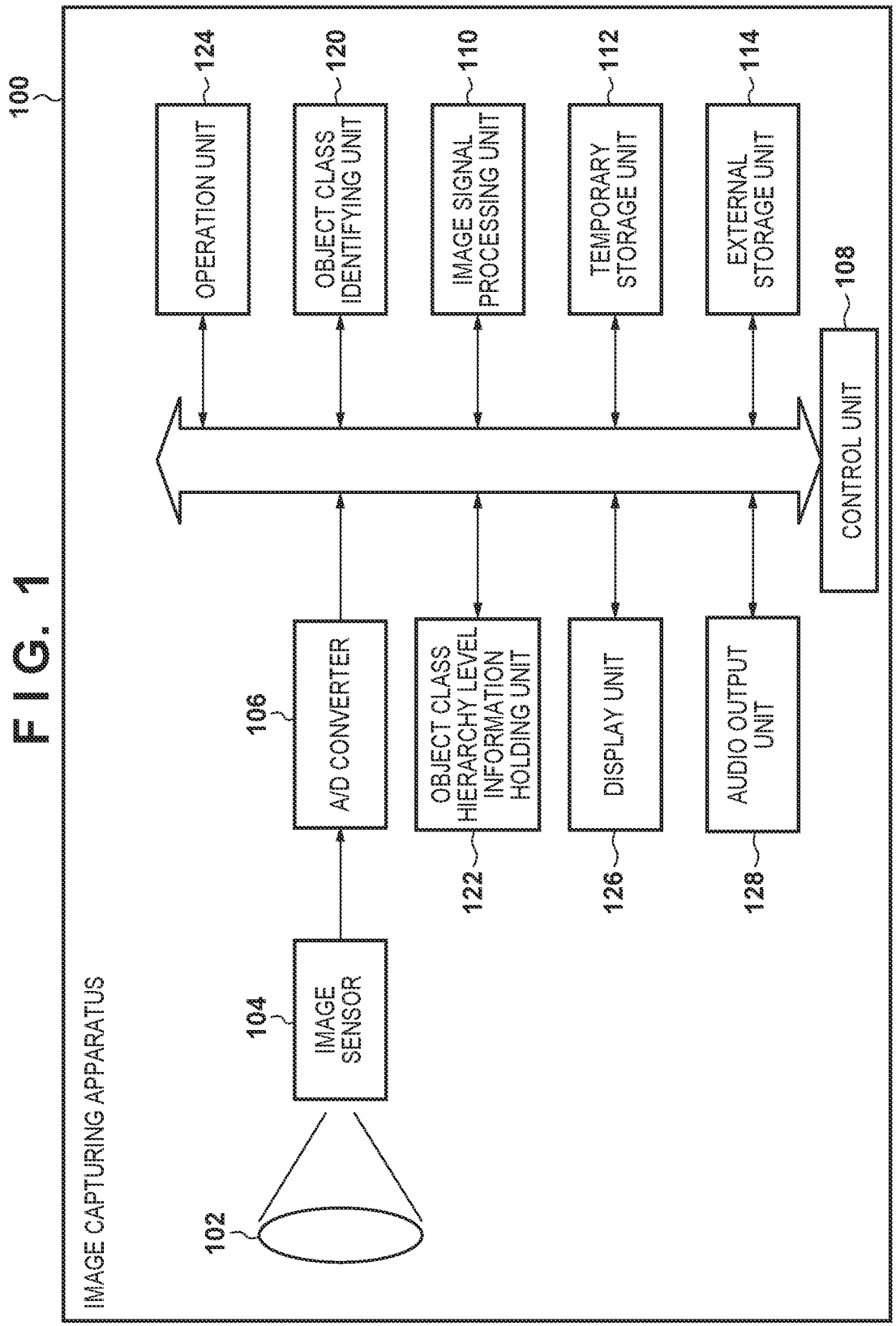
FIG. 1 is a block diagram illustrating the configuration of an image capturing apparatus 100.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram illustrating the configuration of an image capturing apparatus 100 including a notification apparatus. The image capturing apparatus 100 detects a plurality of hierarchically-organized object classes from an image, selecting a specific hierarchy level on the basis of a predetermined selection criterion, prioritizes object classes belonging to the selected hierarchy level, and then notifies a user of one or more of the plurality of object classes. Although the selection criterion for the specific hierarchy level is not particularly limited, the first embodiment will describe an example of a selection criterion used when shooting an image.

In FIG. 1, an image capturing lens 102 optically forms a subject image on an image sensor 104. The image sensor 104 converts the optical subject image into an analog electrical signal. The image sensor 104 includes a plurality of color filters. An A/D converter 106 converts the analog electrical signal output from the image sensor 104 into a digital signal.

A control unit 108 controls the flow of processing for an image signal processing unit 110, a temporary storage unit 112, an external storage unit 114, an object class identifying unit 120, an object class hierarchy level information holding unit 122, an operation unit 124, a display unit 126, and an audio output unit 128. The control unit 108 includes a CPU, ROM storing a control program, and RAM used as working memory, and controls the flow of processing by executing the control program. Note that a Field Programmable Gate Array (FPGA), which is a programmable processor, may be used instead of a CPU.

The image signal processing unit 110 carries out image signal processing, such as synchronization processing, white balance processing, y processing, noise reduction (NR) processing, and the like, as well as object detection processing, on a frame image. The image signal processing unit 110 may, for example, be a dedicated hardware circuit, such as an ASIC, designed to implement specific functions, or may be realized by a programmable processor, such as a DSP, which is configured to implement specific functions by executing software.

The temporary storage unit 112 is memory that stores captured frame images, intermediate processing results of image signals processed by the image signal processing unit 110, and so on. The external storage unit 114 is a storage medium that stores image signals and the like subjected to image processing by the image signal processing unit 110.

The object class identifying unit 120 recognizes an object from an image using information learned in advance. For example, the present embodiment assumes that the object recognition is carried out using a convolutional neural network (CNN). The object class hierarchy level information holding unit 122 holds information expressing a hierarchical relationship between object classes (object class hierarchy level information).

The operation unit 124 accepts operations made by a user of the image capturing apparatus 100. The operation unit 124 includes, for example, buttons and a zoom lever provided in a body of the image capturing apparatus 100, rings provided in a lens unit, and the like.

The display unit 126 is a monitor that displays shot images, recognized object class information, and the like. The audio output unit 128 plays back and outputs recorded audio, uses sounds to notify the user of recognized object class information, and the like. Note that one or more of the image signal processing unit 110, the object class identifying unit 120, the object class hierarchy level information holding unit 122, and the audio output unit 128 may be realized by the CPU of the control unit 108 executing a program. Alternatively, one or more of these functional blocks may be realized by a single hardware circuit such as an ASIC or the like.

Figure 2:
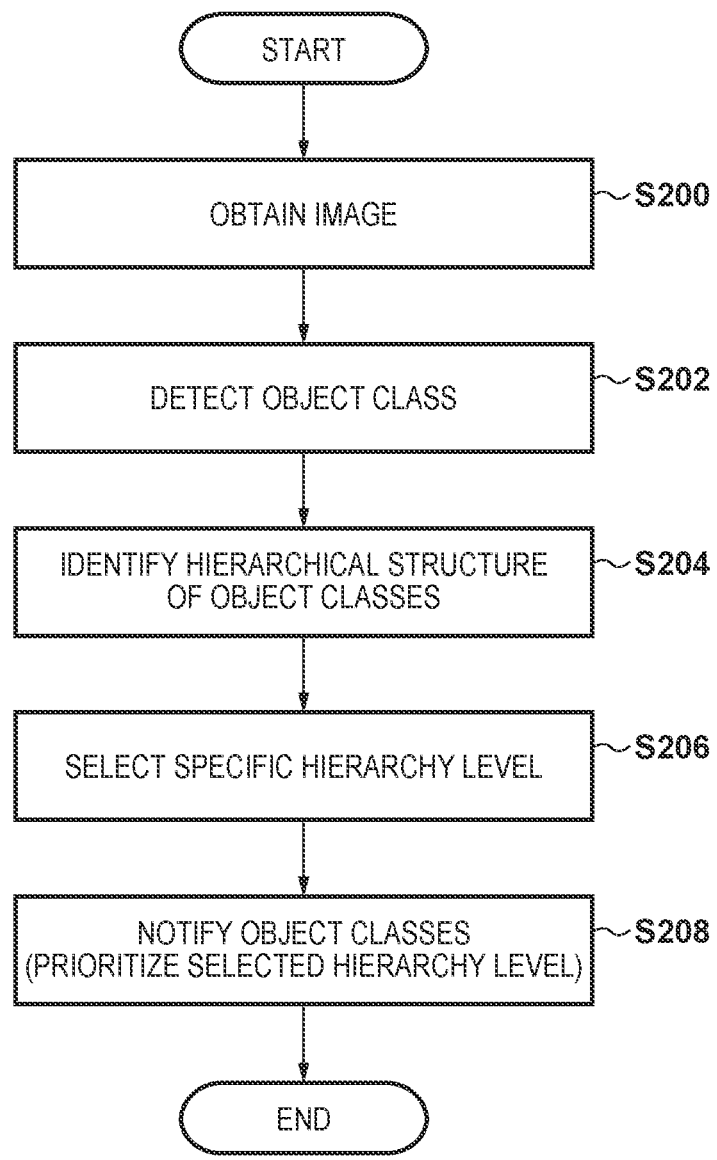
FIG. 2 is a flowchart illustrating an object class notification process carried out when shooting an image.

FIG. 2 is a flowchart illustrating an object class notification process carried out when shooting an image. This notification process is executed repeatedly when, for example, the image capturing apparatus 100 is carrying out continuous shooting under shooting control for carrying out a live-view display.

In step S200, the control unit 108 carries out control for obtaining an image. The image is obtained by storing the digital image signal output from the A/D converter 106 in the temporary storage unit 112. An image for the notification process is obtained by carrying out a series of processes in which the image signal processing unit 110 carries out synchronization processing, white balance processing, y processing, NR processing, and the like on the image stored in the temporary storage unit 112, and then once again stores the image in the temporary storage unit 112.

Figure 6:
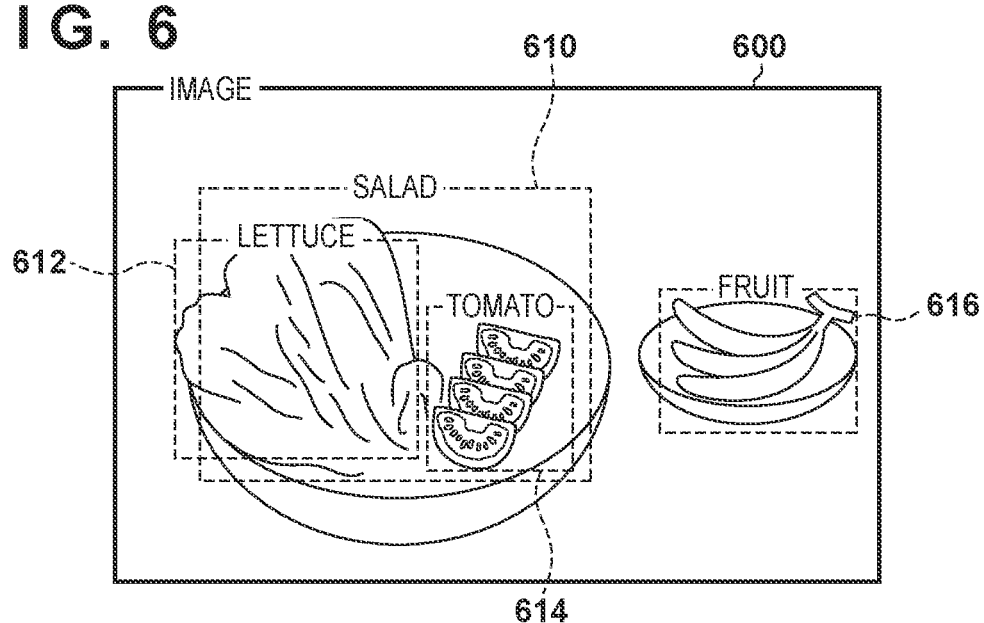
FIG. 6 is a diagram illustrating an example of object class detection.

In step S202, the object class identifying unit 120 detects an object class from the obtained image. FIG. 6 is a diagram illustrating an example of the object class detection. In this example, object classes of "salad", "tomato", "lettuce", and "fruit" are detected in regions 610, 612, 614, and 616, respectively, of an image 600. Although FIG. 6 illustrates the regions 610, 612, 614, and 616 in the image 600 for descriptive purposes, the user is not yet notified of the object classes at the point in time of step S202 in FIG. 2.

Figure 4:
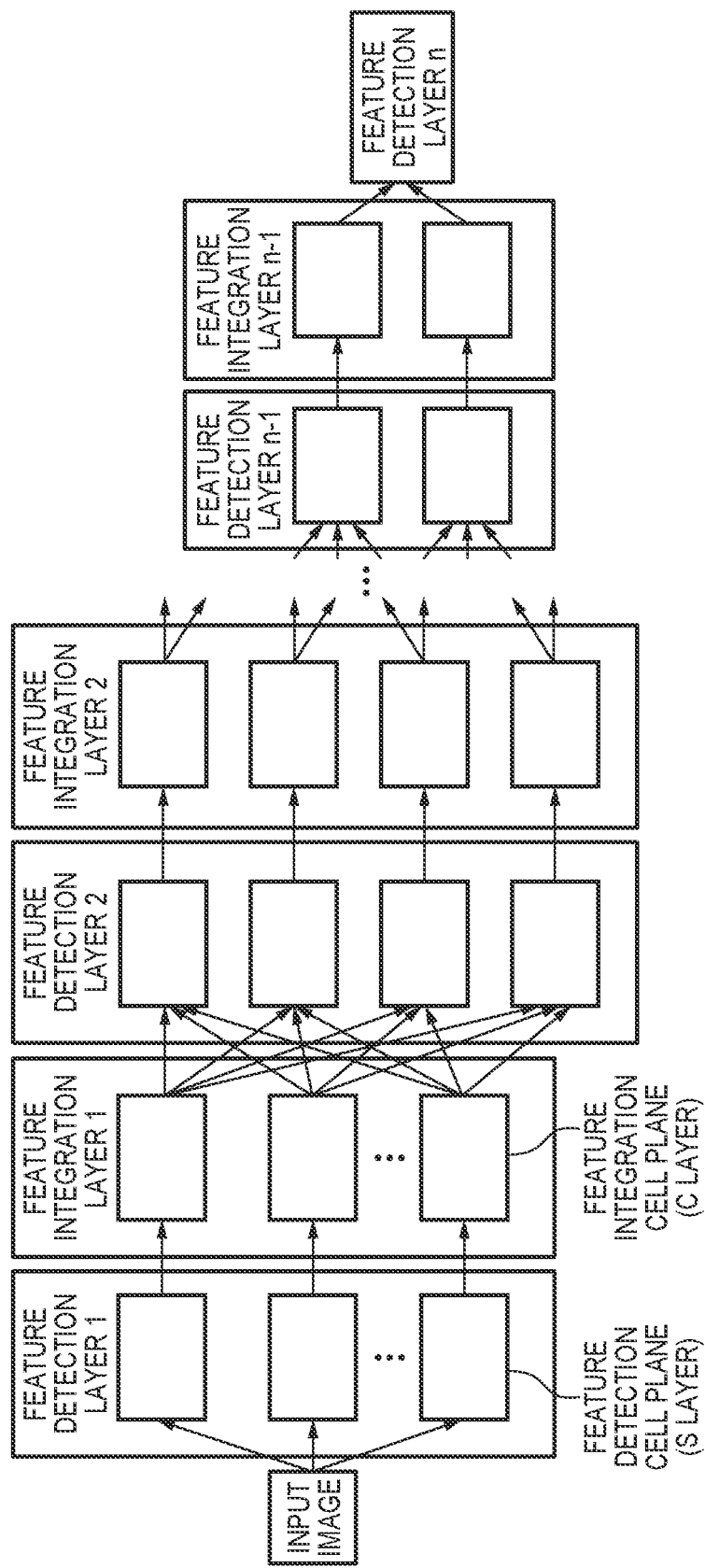
FIG. 4 is a diagram illustrating the basic configuration of a convolutional neural network (CNN) that detects an object class from two-dimensional image data that has been input.

In the present embodiment, the functions of the object class identifying unit 120 are realized by a CNN. The basic configuration of a CNN will be described with reference to FIGS. 4 and 5. FIG. 4 is a diagram illustrating the basic configuration of a CNN that detects an object class from two-dimensional image data that has been input. The processing flows to the right, with the leftmost side corresponding to the input. The CNN takes two layers, called a feature detection layer (an S layer) and a feature integration layer (a C layer) as a single set, and those layers are configured hierarchically.

With the CNN, first, in the S layer, the next feature is detected on the basis of a feature detected in the previous hierarchy level. The features detected in the S layer are integrated in the C layer, and the detection result in that hierarchy level is then sent to the next hierarchy level.

The S layer is constituted by feature detection cell planes, and detects different features in each feature detection cell plane. The C layer is constituted by feature integration cell planes, and pools the detection results from the feature detection cell planes in the previous stage. Unless specified otherwise, the feature detection cell planes and the feature integration cell planes will be collectively referred to as "feature planes". In the present embodiment, an output layer, which is the final hierarchy level, is constituted only by S layers, and does not use C layers.

Figure 5:
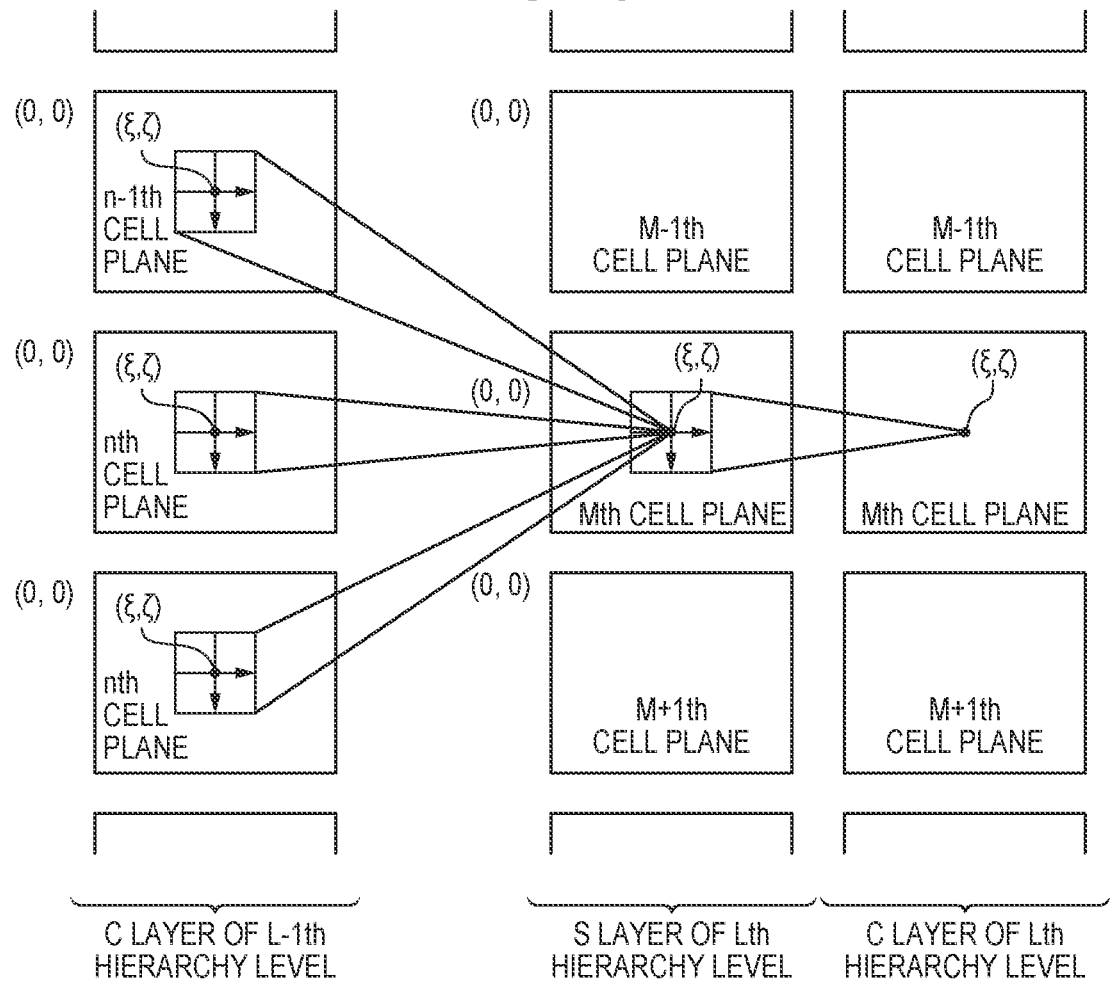
FIG. 5 is a diagram illustrating details of feature detection processing in a feature detection cell plane and feature integration processing in a feature integration cell plane.

Feature detection processing in the feature detection cell plane and feature integration processing in the feature integration cell plane will be described in detail with reference to FIG. 5. The feature detection cell plane is constituted by a plurality of feature detection neurons, and the feature detection neurons are integrated in the C layers of the previous hierarchy level according to a predetermined structure. Meanwhile, the feature integration cell plane is constituted by a plurality of feature integration neurons, and the feature integration neurons are integrated in the S layers of the same hierarchy level according to a predetermined structure. In an Mth cell plane of the S layer in an Lth hierarchy level, illustrated in FIG. 5, an output value of the feature detection neuron at position $(\xi,\zeta)$ is denoted as:

$$y_M^{LS}(\xi,\zeta) \tag{1}$$

In an Mth cell plane of the C layer in the Lth hierarchy level, an output value of the feature integration neuron at position $(\xi,\zeta)$ is denoted as:

$$y_M^{LC}(\xi,\zeta) \tag{2}$$

At this time, assume an integration coefficient of the respective neurons is denoted as:

$$w_M^{LS}(n,u,v), w_M^{LC}(u,v) \tag{3}$$

In this case, the respective output values can be expressed as follows:

$$y_M^{LS}(\xi,\zeta) \equiv f(u_M^{LS}(\xi,\zeta)) \equiv f\left\{\sum_{n,u,v} w_M^{LS}(n,u,v) \cdot y_n^{L-1C}(\xi+u,\zeta+v)\right\} \tag{4}$$

$$y_M^{LC}(\xi,\zeta) \equiv u_M^{LC}(\xi,\zeta) \equiv \sum_{u,v} w_M^{LC}(u,v) \cdot y_M^{LS}(\xi+u,\zeta+v) \tag{5}$$

f in Expression 4 represents an activation function. This may be any type of sigmoid function, such as a logistic function or a hyperbolic tangent function, and may be expressed as a tan h function, for example.

$$u_M^{LS}(\xi,\zeta) \tag{6}$$

Expression 6 represents the internal state of the feature detection neuron at position $(\xi,\zeta)$ in the Mth cell plane of the S layer in the Lth hierarchy level. Expression 5 finds a simple linear sum without using an activation function. When, as in Expression 5, an activation function is not used, the internal state of the neuron, i.e., $$u_M^{LC}(\xi,\zeta) \tag{7}$$

and the output value, i.e., $$y_M^{LC}(\xi,\zeta) \tag{8}$$

are equal. Additionally, $$y_n^{L-1C}(\xi+u,\zeta+v) \tag{9}$$

in Expression 4, and $$y_M^{LS}(\xi+u,\zeta+v) \tag{10}$$

in Expression 5 are called "integration destination output values" of the feature detection neuron and the feature integration neuron, respectively.

$\xi$, $\zeta$, u, v, and n in Expressions 4 and 5 will be described next. Position $(\xi,\zeta)$ corresponds to positional coordinates in the input image, and when, for example, $$y_M^{LS}(\xi,\zeta) \tag{11}$$

is a high output value, this means that it is highly likely that a feature to be detected in the Mth cell plane of the S layer in the Lth hierarchy level is present at a pixel position $(\xi,\zeta)$ in the input image. n in Expression 5 indicates an nth cell plane in the C layer of an L–1th hierarchy level, and is called an "integration destination feature number". Basically, a product-sum operation is carried out for all cell planes present in the C layer of the L–1th hierarchy level. (u,v) represents relative positional coordinates of the integration coefficient, and a product-sum operation is carried out in a limited range (u,v) in accordance with the size of the feature to be detected. This limited range (u,v) is called a "receptive field". The size of the receptive field will be called the "receptive field size" hereinafter, and is expressed as a number of horizontal pixels×a number of vertical pixels in an integrated range.

In Expression 4, in the S layer where L=1, or in other words, in the first S layer, $$y_n^{L-1C}(\xi+u,\zeta+V) \tag{12}$$

is an input image, i.e., $$y^{in\_image}(\xi+u,\zeta+v) \tag{13}$$

or an input position map, i.e., $$y^{in\_posi\_map}(\xi+u,\zeta+v) \tag{14}$$

Incidentally, neurons, pixels, and the like are distributed discretely, and the integration destination feature number is also discrete. $\xi$, $\zeta$, u, v, and n are thus discrete values rather than continuous variables. Here, ξ and ζ are non-negative integers, n is a natural number, and u and v are integers, and all have limited ranges.

In Expression 4, $$w_M^{LS}(n,u,v) \quad (15)$$

represents an integration coefficient distribution for detecting a predetermined feature, and the predetermined feature can be detected by adjusting that integration coefficient distribution to an appropriate value. The adjustment of the integration coefficient distribution is training, and in the CNN construction, the integration coefficient is adjusted by presenting a variety of test patterns to repeatedly and gradually correct the integration coefficient so that the following becomes an appropriate output value:

$$y_M^{LS}(\xi,\zeta) \quad (16)$$

Next, in Expression 5, $$w_M^{LC}(u,v) \quad (17)$$

uses a two-dimensional Gaussian function, and can be expressed as indicated by the following Expression 18.

$$w_M^{LC}(u, v) = \frac{1}{2\pi\sigma_{L,M}^2} \cdot \exp\left(-\frac{u^2 + v^2}{2\sigma_{L,M}^2}\right) \quad (18)$$

Here too, (u,v) is a limited range, and as with the feature detection neuron, the limited range will be called a "receptive field" and the size of the range will be called a "receptive field size". The receptive field size may be set to any suitable value in accordance with the size of the Mth feature in the S layer of the Lth hierarchy level. In Expression 18, σ represents a feature size factor, and may be set to any suitable constant in accordance with the receptive field size. Specifically, σ may be set so that values furthest on the outside of the receptive field are values that can substantially be treated as zero.

Carrying out computations such as those described above in each hierarchy level, and identifying (detecting) an object class in the S layer of the final hierarchy level, is how the CNN is configured according to the present embodiment. The CNN is trained in advance, before the shooting in step S200 of FIG. 2, and the training result is held in the object class identifying unit 120.

A specific training method will be described next. In the present embodiment, the integration coefficient is adjusted through supervised training. In supervised training, an actual neuron output value is found by supplying a test pattern, and based on a relationship between the output value and a supervisory signal (a desired output value to be output by that neuron), the integration coefficient:

$$w_M^{LS}(n,u,v) \quad (19)$$

may be adjusted. In the training according to the present embodiment, the integration coefficient is corrected by using the least-squares method in the final feature detection layer and using an error back propagation method in intermediate feature detection layers. Known techniques such as those described in, for example, pages 156 to 255 of "S. Haykin, 'Neural Networks: A Comprehensive Foundation', Second Edition, Prentice Hall, July 1998", can be used as the specific methods for correcting the integration coefficient, i.e., the least-squares method, the error back propagation method, and so on.

In the present embodiment, when training in advance, many specific patterns to be detected and patterns not to be detected are prepared as test patterns for the training, and when additional training is to be carried out, test patterns are selected from a buffer using the aforementioned method. Each test pattern takes an image and a supervisory signal as a single set.

If the tan h function is used for the activation function, when the specific pattern to be detected is presented, the supervisory signal is supplied so that an output of 1 is obtained for the neurons, in the feature detection cell plane in the final layer, located in the regions where the specific pattern is present. Conversely, when a pattern not to be detected is presented, the supervisory signal is supplied so that an output of −1 is obtained for the neurons located in the regions of that pattern.

A CNN for identifying (detecting) an object class from a two-dimensional image is constructed in this manner. During actual detection, computations are carried out using the integration coefficient constructed through this training, i.e., $$w_M^{LS}(n,u,v) \quad (20)$$

If the output of a neuron in the feature detection cell plane in the final layer is greater than or equal to a predetermined value, the corresponding object class is determined to be present at that location.

Next, after the training is complete, information expressing a hierarchical relationship among object classes (object class hierarchy level information) is obtained. This collection method will be described hereinafter.

Figure 7A:
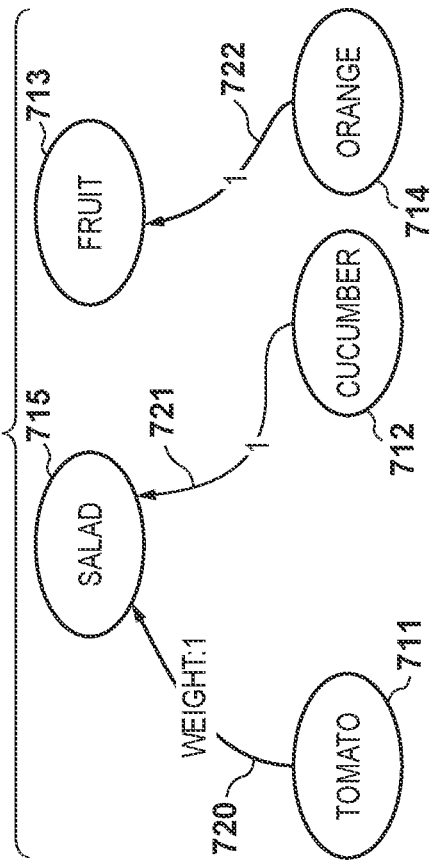
FIGS. 7A to 7D are diagrams illustrating a method for collecting object class hierarchy level information.

FIG. 7A illustrates a situation where, in a training image 700, neuron outputs in the feature detection cell plane of the final layer of a CNN, corresponding to predetermined object classes, are greater than or equal to a predetermined value, and those object classes have been detected as a result. Specifically, object classes "salad", "tomato", "cucumber", "fruit", and "orange" have been detected. The regions where the object classes have been detected are indicated as a salad region 701, a tomato region 703, a cucumber region 705, a fruit region 707, and an orange region 709.

Coordinates 702, 704, 706, 708, and 710 indicate center coordinates of the salad region 701, the tomato region 703, the cucumber region 705, the fruit region 707, and the orange region 709, respectively.

Figure 7B:
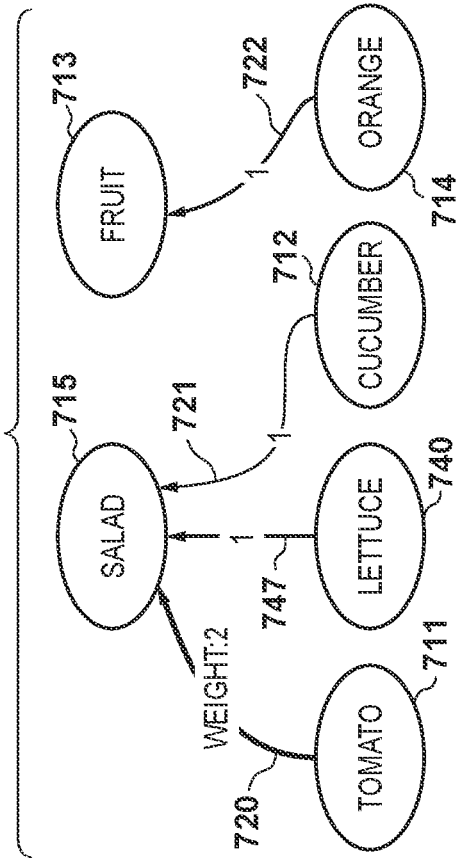

The object class hierarchy level information illustrated in FIG. 7B is generated from the detected object classes illustrated in FIG. 7A through the following procedure.

First, the coordinates 704 indicating the center of the tomato region 703 and the coordinates 706 indicating the center of the cucumber region 705 are present within the salad region 701. As such, the object class "salad" may contain the object classes "tomato" and "cucumber", and is therefore determined to have a high level of relevance. In FIG. 7B, a salad node 715 representing the object class "salad" and a tomato node 711 representing the object class "tomato" are connected by an edge 720, and the edge 720 is given a weight of 1. Likewise, the salad node 715 is connected to a cucumber node 712, representing the object class "cucumber", by an edge 721, and the edge 721 is given a weight of 1.

Similarly, the coordinates 710 are present within the fruit region 707, and thus the object classes of "fruit" and "orange" are determined to have a high level of relevance. As illustrated in FIG. 7B, a fruit node 713 representing the object class "fruit" and an orange node 714 representing the object class "orange" are connected by an edge 722, and the edge 722 is given a weight of 1.

Additionally, as illustrated in FIG. 7A, the coordinates 704 indicating the center of the tomato region 703 and the coordinates 706 indicating the center of the cucumber region 705 are present within the salad region 701. It is therefore determined that the object classes of "tomato" and "cucumber" may be a part of the object class "salad". As a result, the object class "salad" is determined to be an object class having a higher level of abstraction (in a higher hierarchy level) than the object classes of "tomato" and "cucumber".

Reflecting this determination result, in FIG. 7B, the edge 720 is expressed as pointing from the tomato node 711 to the salad node 715, and the edge 721 is expressed as pointing from the cucumber node 712 to the salad node 715.

Likewise, as illustrated in FIG. 7A, the coordinates 710 indicating the center of the orange region 709 are present within the fruit region 707. It is therefore determined that the object class "orange" may be a part of the object class "fruit". As a result, the object class "fruit" is determined to be an object class having a higher level of abstraction (in a higher hierarchy level) than the object class of "orange".

Reflecting this determination result, in FIG. 7B, the edge 722 is expressed as pointing from the orange node 714 to the fruit node 713.

Figure 7C:
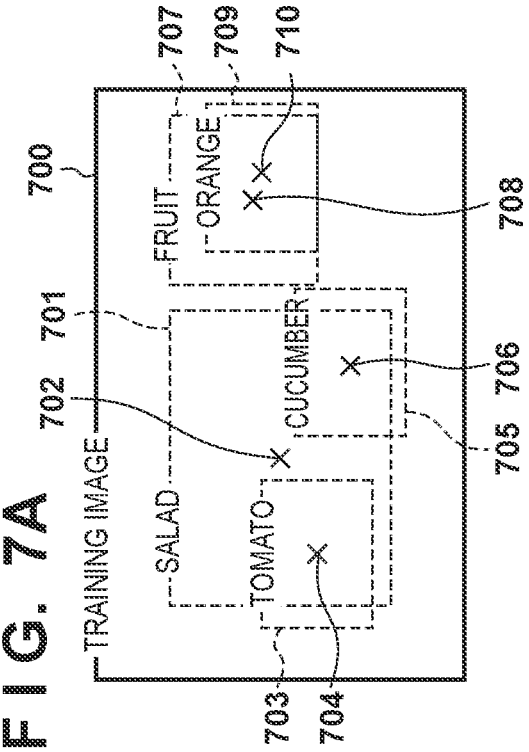
Figure 7D:
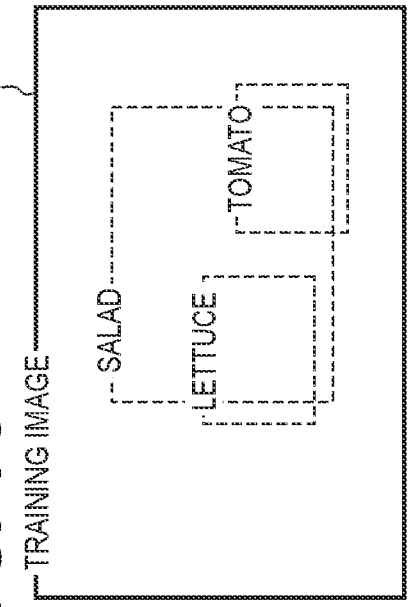

Similarly, the object class hierarchy level information illustrated in FIG. 7D is generated from the object classes detected in training image 730 of FIG. 7C, which is different from the training image 700 illustrated in FIG. 7A. At this time, the object class hierarchy level information illustrated in FIG. 7D is generated by adding information to the object class hierarchy level information illustrated in FIG. 7B. Specifically, a lettuce node 740, and an edge 747 pointing from the lettuce node 740 to the salad node 715, are added, and the edge 747 is given a weight of 1. Furthermore, the weight of the edge 720 pointing from the tomato node 711 to the salad node 715 is increased from 1 to 2. This means that the object class "salad" is more strongly related to the object class "tomato" than the object classes "lettuce" and "cucumber".

Alternatively, a node having more edges pointing toward the node may be thought of as a node representing a class containing one or more of another class, and that class may therefore be determined to be an object class having a higher level of abstraction (in a higher hierarchy level).

The object class hierarchy level information obtained in this manner is stored in the object class hierarchy level information holding unit 122.

Returning to FIG. 2, in step S204, the control unit 108 identifies a hierarchical structure of the object classes detected in step S202, on the basis of the object class hierarchy level information held in the object class hierarchy level information holding unit 122.

Figure 8A:
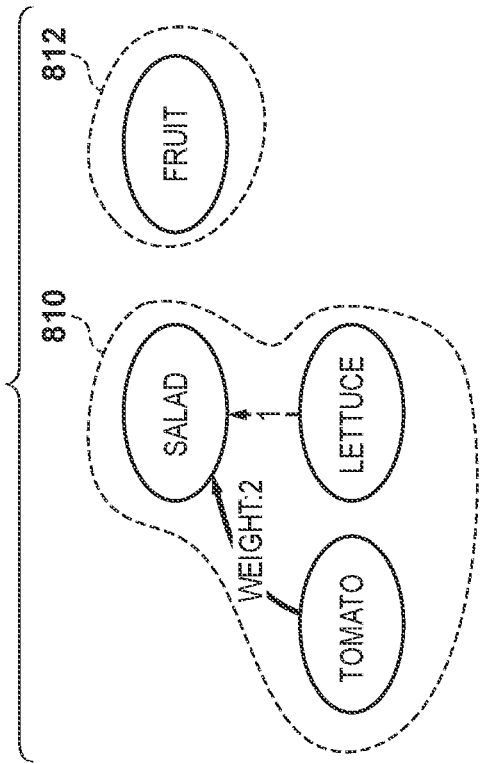
FIGS. 8A and 8B are diagrams illustrating the recognition of a hierarchical structure of object classes.
Figure 8B:
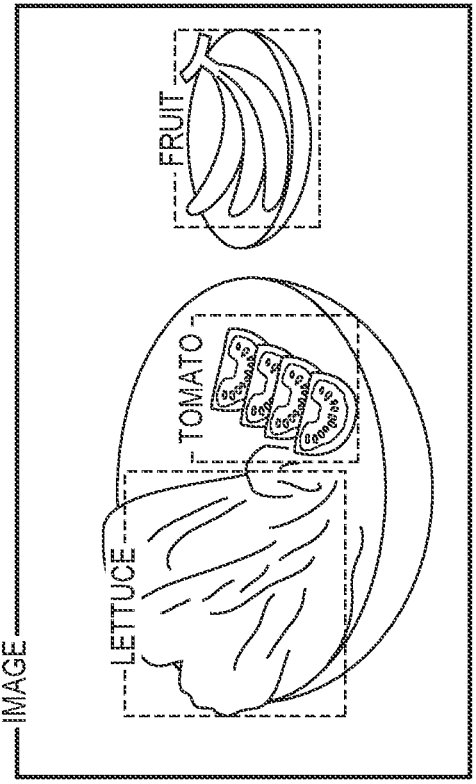

As described above, in the present embodiment, the object classes "salad", "tomato", "lettuce", and "fruit" have been detected from the image 600 in FIG. 6. The control unit 108 verifies these object classes against the object class hierarchy level information illustrated in FIG. 7D. As a result, it can be seen, as illustrated in FIGS. 8A and 8B, that the object classes "salad", "tomato", and "lettuce" belong to a group 810, and the object class "fruit" belongs to a group 812. In other words, the four object classes detected in step S202 are identified as being organized hierarchically as indicated in FIG. 8B, according to a hierarchical structure in which object classes in higher hierarchy levels contain object classes in lower hierarchy levels (see FIG. 7D).

In step S206, the control unit 108 selects the hierarchy level of an object class for which a notification is to be provided preferentially. In step S208, the control unit 108 notifies the user of one or more of the detected plurality of object classes, with priority given to object classes belonging to the selected hierarchy level. In the present embodiment, one or more of the object classes are selected, in accordance with the selected hierarchy level, from among the object classes "salad", "tomato", and "lettuce" belonging to the group 810 and the object class "fruit" belonging to the group 812.

Figure 9A:
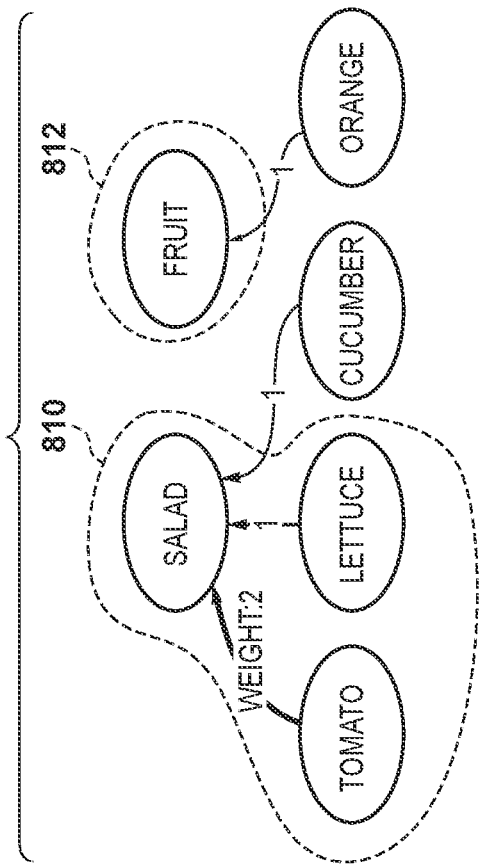
FIGS. 9A and 9B are diagrams illustrating the notification of an object class in accordance with a zoom lever operation.
Figure 9B:
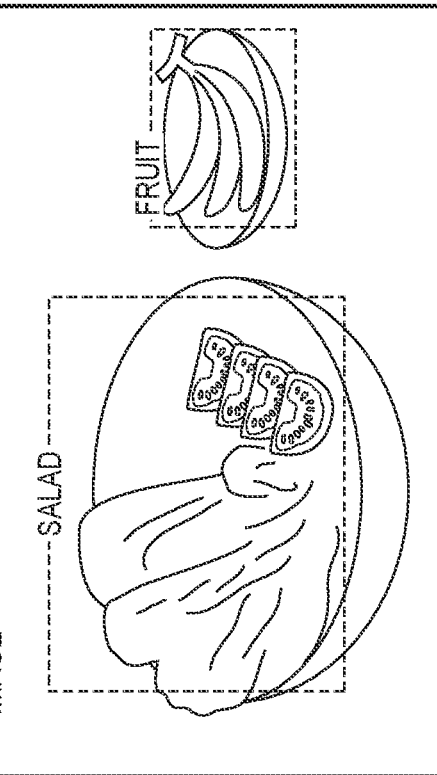

A specific example of the processing of steps S206 and S208 will be described here. When the user moves the zoom lever included in the operation unit 124 to the wide-angle side, the control unit 108 determines that the user intends to capture objects at a wider angle of view. Accordingly, as illustrated in FIG. 9A, the control unit 108 selects the object class "salad", which has a higher level of abstraction (is in a higher hierarchy level), from the group 810, and displays that object class in the display unit 126. On the other hand, when the user moves the zoom lever included in the operation unit 124 to the telephoto side, the control unit 108 determines that the user intends to capture objects at a narrower angle of view. Accordingly, as illustrated in FIG. 9B, the control unit 108 selects the object classes "tomato" and "lettuce", which have a lower level of abstraction (are in a lower hierarchy level), from the group 810, and displays those object classes in the display unit 126. As can be seen by comparing FIGS. 9A and 9B, the control unit 108 selects a higher hierarchy level than the previously-selected hierarchy level when a zoom operation is made toward the wide-angle side, and selects a lower hierarchy level than the previously-selected hierarchy level when a zoom operation is made toward the telephoto side.

Note that as illustrated in FIG. 8B, the object class "salad" has a greater weight on the edge connecting to the object class "tomato" than the edge connecting to the object class "lettuce", and therefore has a stronger relationship. In light of this, if the hierarchy level to which the object classes "tomato" and "lettuce" belong has been selected, the control unit 108 may display only the object class "tomato".

Additionally, only the object class "fruit" belongs to the group 812, and thus the control unit 108 selects the object class "fruit", and displays that object class in the display unit 126, regardless of zoom lever operations, as illustrated in FIGS. 9A and 9B. Alternatively, it will be difficult for the user to recognize the object class "fruit" in the image if the user uses the zoom lever to set the magnification rate to greater than or equal to a predetermined value or less than or equal to a predetermined value, and thus the control unit 108 may avoid selecting an object class from the group 812.

In this manner, the control unit 108 selects a specific hierarchy level on the basis of a user operation (here, a zoom operation to the wide-angle side or the telephoto side), and then notifies the user of one or more of the detected plurality of object classes, with priority given to object classes belonging to the selected hierarchy level. Note that when a predetermined condition is satisfied, e.g., when there is a low number of detected object classes (a number less than or equal to a threshold), the control unit 108 may notify the user of all of the detected plurality of object classes.

As described earlier, the selection criterion for the specific hierarchy level is not particularly limited, and a selection criterion aside from a user operation may be used as well. For example, the control unit 108 may select the hierarchy level to which the object class having the highest degree of focus among the detected plurality of object classes belongs.

Additionally, the method for notifying the user of the object classes is not limited to the method of displaying information indicating the object classes for notification in the display unit 126 (FIGS. 9A and 9B). For example, the control unit 108 may notify the user of the object classes by outputting, from the audio output unit 128, audio indicating the object classes for notification (e.g., a voice reading the names).

Figure 12:
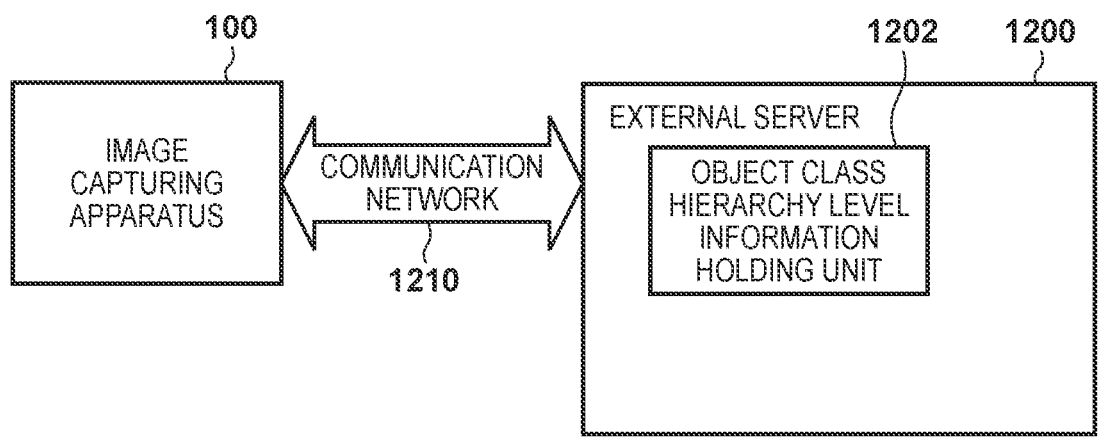
FIG. 12 is a diagram illustrating a variation on FIG. 1.

Furthermore, the object class hierarchy level information holding unit 122 need not be included in the image capturing apparatus 100. A configuration may be employed in which the image capturing apparatus 100 is connected, over a communication network 1210, to an external server 1200 including an object class hierarchy level information holding unit 1202, as illustrated in FIG. 12. With this configuration, in step S204 of FIG. 2, the control unit 108 sends the object classes detected by the object class identifying unit 120 to the external server 1200 over the communication network 1210. Then, the object class hierarchy level information holding unit 1202 identifies the hierarchical structure of the received object classes, and sends information of the identified hierarchical structure to the image capturing apparatus 100.

According to the first embodiment as described thus far, the image capturing apparatus 100 detects a hierarchically-organized plurality of object classes from an image, and selects a specific hierarchy level on the basis of a predetermined selection criterion. The image capturing apparatus 100 then notifies the user of one or more of the plurality of object classes, with priority given to object classes belonging to the selected hierarchy level. Through this, a level of abstraction (level in the hierarchy) of the object classes subject to notification can be aligned to a certain degree, which makes it possible for the user to easily recognize the object classes of which he or she has been notified.

Second Embodiment

A second embodiment will describe an example of a selection criterion for a hierarchy level of object classes for which a notification is to be made preferentially, used when playing back an image. In the present embodiment, the basic configuration of the image capturing apparatus 100 is the same as in the first embodiment (see FIG. 1). The following will primarily describe areas that are different from the first embodiment.

Figure 3:
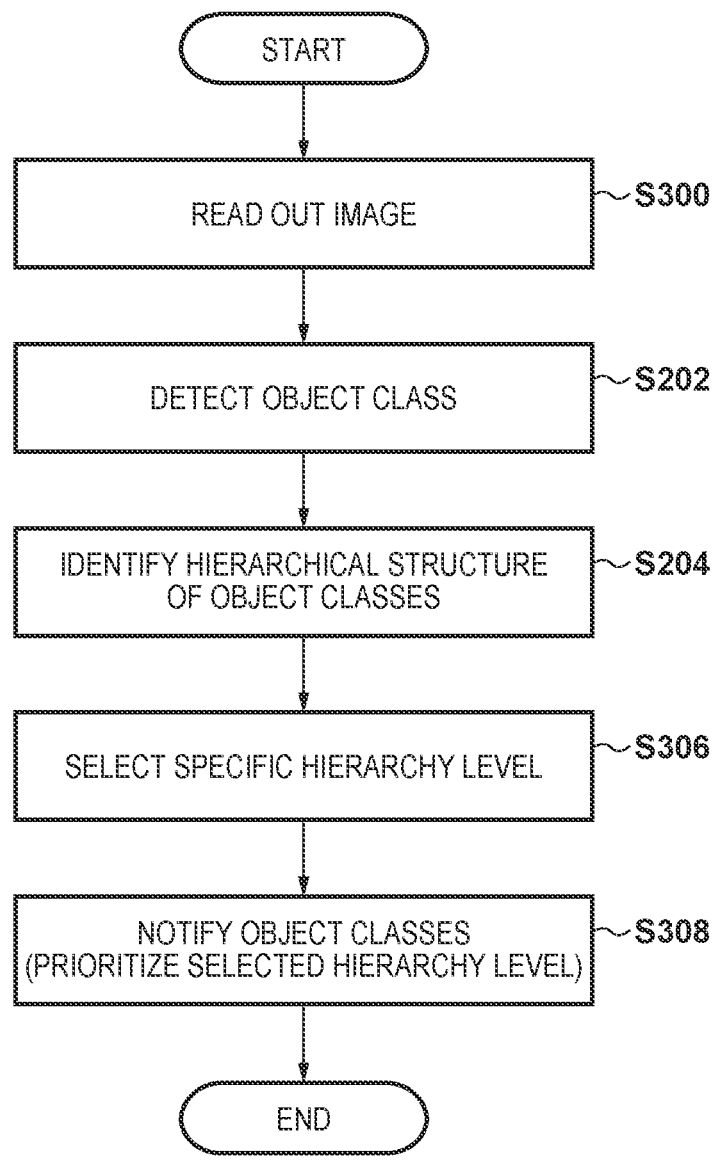
FIG. 3 is a flowchart illustrating an object class notification process carried out when playing back an image.

FIG. 3 is a flowchart illustrating an object class notification process carried out when playing back an image. This notification process is executed in response to an image to be played back being selected through a user operation, for example.

In step S300, the control unit 108 reads out an image to be played back from the external storage unit 114. The processing of steps S202 and S204 that follow thereafter are the same as the processing of steps S202 and S204 in FIG. 2.

Note that the image capturing apparatus 100 may record information indicating object classes detected during shooting, and information indicating the hierarchical structure of the detected object classes, as metadata of a recorded image. In this case, the control unit 108 can obtain the object classes and the hierarchical structure thereof from the metadata, and thus the processing of steps S202 and S204 can be omitted.

In step S306, the control unit 108 selects the hierarchy level of an object class for which a notification is to be provided preferentially. In step S308, the control unit 108 notifies the user of one or more of the detected plurality of object classes, with priority given to object classes belonging to the selected hierarchy level.

Figure 10B:
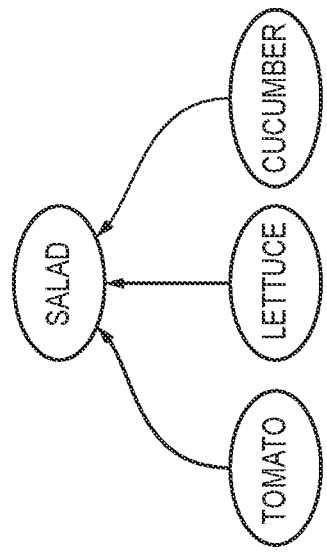
FIGS. 10A to 10E are diagrams illustrating the notification of an object class in accordance with an image display region.
Figure 10E:
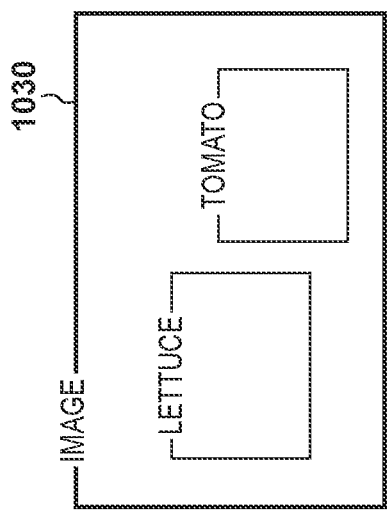

A specific example of the processing of steps S306 and S308 will be described here. An image 1000 in FIG. 10A is a display image (an image to be displayed), and object classes of "salad", "lettuce", "tomato", and "cucumber" have been detected. FIG. 10B expresses a relationship among the detected object classes (i.e., the hierarchical structure).

Figure 10D:
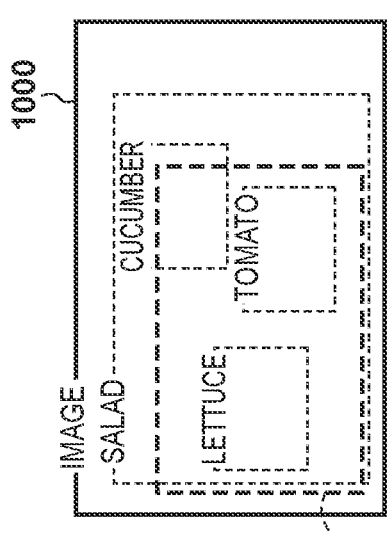
Figure 10A:
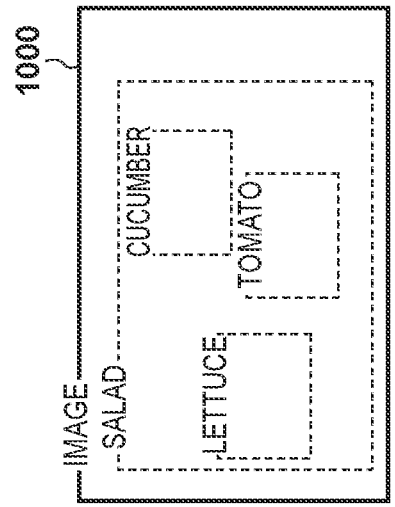
Figure 10C:
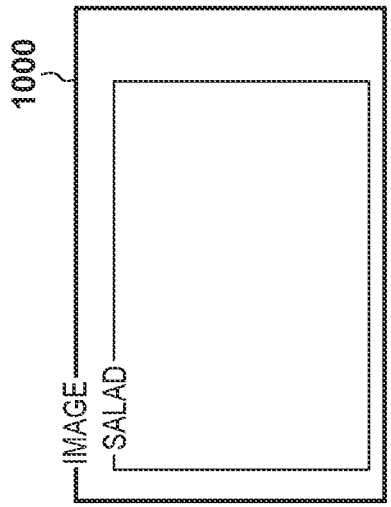

When the user has displayed the entire image 1000 in the display unit 126, the control unit 108 determines that the user is focusing on the entire image 1000, and notifies the user only of the object class "salad", which has a higher level of abstraction (is in a higher hierarchy level), as illustrated in FIG. 10C.

Consider a case where a region 1030 of the image 1000 has been enlarged, as illustrated in FIG. 10D. In this case, the control unit 108 determines that the user is focusing not on the object class "salad", which has a higher level of abstraction, but rather on the object classes of "lettuce" and "tomato", which have a lower level of abstraction. The control unit 108 then notifies the user only of the object classes "lettuce" and "tomato", as illustrated in FIG. 10E.

In this manner, the control unit 108 selects a hierarchy level on the basis of the display magnification rate of the image. The hierarchy level selected when the display magnification rate is high (see FIG. 10E) is a lower hierarchy level than the hierarchy level selected when the display magnification rate is low (see FIG. 10C).

An object class notification method used when carrying out display control in which a plurality of images are read out from the external storage unit 114 and arranged in the display unit 126 as thumbnail images will be described next.

Figure 11A:
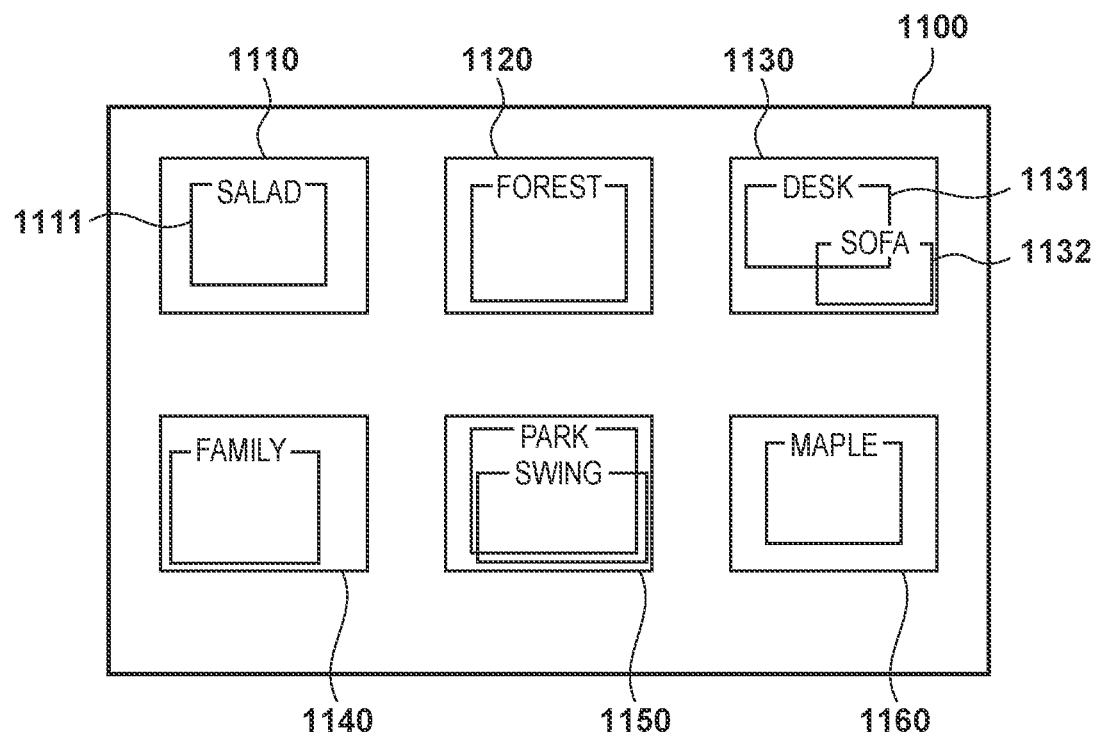
FIGS. 11A and 11B are diagrams illustrating the notification of an object class in a thumbnail display.

A frame 1100 in FIG. 11A expresses a display range of the display unit 126, and six thumbnail images (thumbnail images 1110, 1120, 1130, 1140, 1150, and 1160) are displayed in the frame 1100.

Because the thumbnail images are reduced versions of shot images, only the same amount, or less, of the object class information can be displayed, as compared to when using a shot image. Accordingly, the control unit 108 selects a predetermined number of the detected object classes, starting with the class having the highest level of abstraction. In other words, when the thumbnail display is used, the control unit 108 selects the highest hierarchy level as the hierarchy level of the object classes for which a notification is to be made preferentially. Alternatively, the control unit 108 may display only the object class having the highest level of abstraction (i.e., belonging to the highest hierarchy level).

Alternatively, on the basis of the sizes of regions occupied by the detected object classes, the control unit 108 may select and display a predetermined number of classes in order from the class occupying the greatest percentage of the thumbnail images, or display only the object class occupying the greatest percentage of the thumbnail images.

For example, the thumbnail image 1110 is a thumbnail image of the image 1000 illustrated in FIG. 10A, but because the thumbnail image 1110 is smaller than the image 1000, the control unit 108 displays only the object class "salad", which has the highest level of abstraction (i.e., belonging to the highest hierarchy level). Meanwhile, an object class "desk" 1131 and an object class "sofa" 1132 are detected in a thumbnail image 1130, but the levels of abstraction are substantially the same, and thus the control unit 108 displays both of these object classes.

Figure 11B:
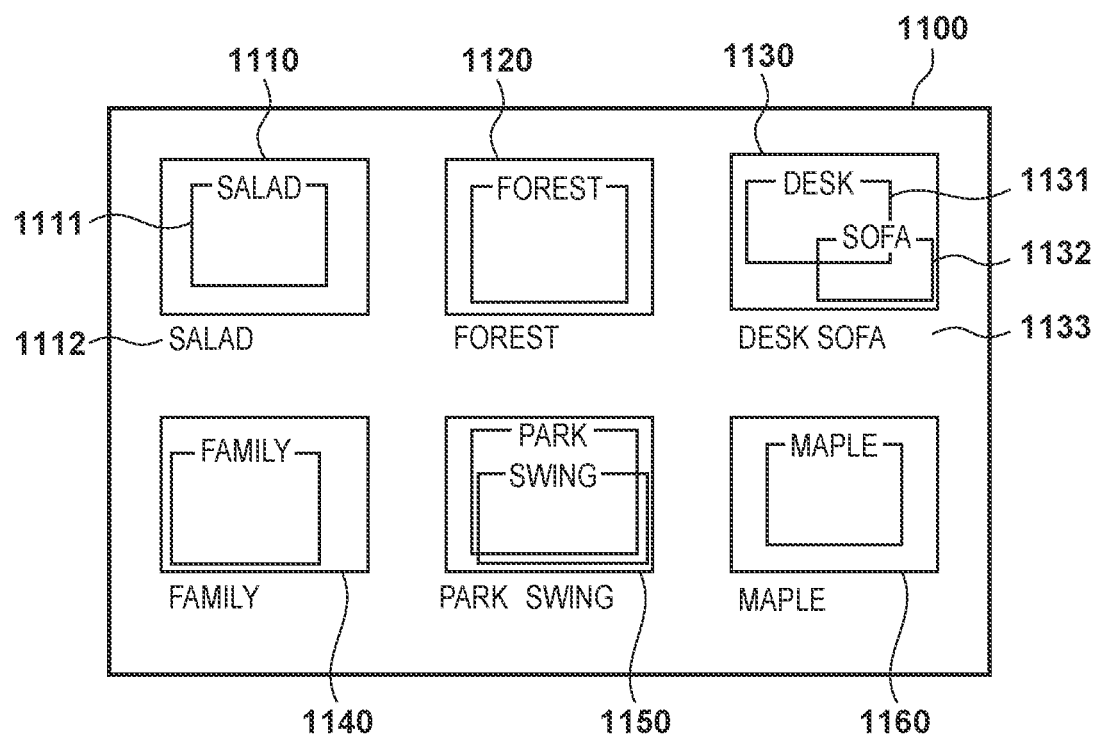

Additionally, as illustrated in FIG. 11B, the name of the object class (information indicating the object class subject to notification) may be displayed as a character string near the thumbnail image. At this time, a predetermined number of names of object classes displayed as character strings are selected in order from the class having the highest level of abstraction, and are then displayed on the basis of the sizes of the thumbnail images. Alternatively, only the name of the object class having the highest level of abstraction may be displayed. Here, "near the thumbnail image" refers to a range at which the user can recognize that the displayed character string is related to the corresponding thumbnail image.

For example, with respect to the thumbnail image 1110, the control unit 108 displays text reading "salad" below the thumbnail image 1110 as an object class tag 1112. Additionally, with respect to the thumbnail image 1130, the control unit 108 displays text reading "desk" and "sofa" below the thumbnail image 1130 as an object class tag 1133.

Additionally, the control unit 108 may select the hierarchy level of the object classes, for which a notification is to be made preferentially, on the basis of a user operation. For example, the control unit 108 may select a hierarchy level in accordance with a zoom lever operation, in the same manner as that described in the first embodiment with reference to FIGS. 9A and 9B.

According to the second embodiment as described thus far, when an image is played back, the image capturing apparatus 100 detects a hierarchically-organized plurality of object classes from an image, and selects a specific hierarchy level on the basis of a predetermined selection criterion (e.g., a display region of the image, whether or not the display is a thumbnail display, and so on). The image capturing apparatus 100 then notifies the user of one or more of the plurality of object classes, with priority given to object classes belonging to the selected hierarchy level. Through this, a level of abstraction (level in the hierarchy) of the object classes subject to notification can be aligned to a certain degree, which makes it possible for the user to easily recognize the object classes of which he or she has been notified. Note that as in the first embodiment, when a predetermined condition is satisfied, e.g., when there is a low number of detected object classes (a number less than or equal to a threshold), the control unit 108 may notify the user of all of the detected plurality of object classes.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-101485, filed on May 30, 2019, which is hereby incorporated by reference herein in its entirety.

What is claimed is:

1. An image capturing apparatus comprising at least one processor and/or at least one circuit which functions as:
   a shooting control unit configured to carry out continuous shooting;
   a detection unit configured to detect, from a specific image obtained through the continuous shooting, a specific plurality of object classes, the object classes being organized hierarchically in a plurality of hierarchy levels according to a hierarchical structure in which an object class in a higher hierarchy level contains an object class in a lower hierarchy level, wherein the object class in the higher hierarchy level has a higher level of abstraction than the object class in the lower hierarchy level;
   a selection unit configured to select, during the continuous shooting, a specific hierarchy level from the plurality of hierarchy levels on the basis of a predetermined selection criterion; and
   a notification unit configured to notify, during the continuous shooting, a user of one or more of the specific plurality of object classes detected from the specific image, with priority given to an object class belonging to the specific hierarchy level selected from the plurality of hierarchy levels,
   wherein in a case where the specific plurality of object classes organized hierarchically is detected from the specific image, the notification unit notifies the user of the object class belonging to the specific hierarchy level selected by the selection unit, with priority given to the object class belonging to the specific hierarchy level,
   wherein the selection unit further selects the specific hierarchy level on the basis of a user operation,
   when an operation for zooming to a wide-angle side has been made during the continuous shooting, the selection unit selects, as the specific hierarchy level, a hierarchy level higher than a hierarchy level selected a previous time; and
   when an operation for zooming to a telephoto side has been made during the continuous shooting, the selection unit selects, as the specific hierarchy level, a hierarchy level lower than a hierarchy level selected a previous time.

2. The image capturing apparatus according to claim 1, wherein the selection unit selects, as the specific hierarchy level, a hierarchy level to which an object class having a highest degree of focus among the plurality of object classes belongs.

3. The image capturing apparatus according to claim 1, wherein the notification unit notifying the user of one or more of the plurality of object classes includes displaying, on a display, information indicating the object class for notification.

4. The image capturing apparatus according to claim 1, wherein the notification unit notifying the user of one or more of the plurality of object classes includes outputting, from an audio output unit, audio indicating the object class for notification.

5. The image capturing apparatus according to claim 1, wherein when a number of the plurality of object classes is less than or equal to a threshold, the notification unit notifies the user of all of the plurality of object classes.

6. The image capturing apparatus according to claim 1, wherein the detection unit utilizes a convolutional neural network for the detection and organization of the plurality of object classes.

7. A notification apparatus comprising at least one processor and/or at least one circuit which functions as:
an obtainment unit configured to obtain a plurality of object classes organized hierarchically according to a hierarchical structure in which an object class in a higher hierarchy level contains an object class in a lower hierarchy level, the plurality of object classes having been detected from a specific image regardless of a display magnification rate of the specific image and including at least one object class in a first hierarchy level and at least one object class in a second hierarchy level lower than the first hierarchy level, wherein the object class in the higher hierarchy level has a higher level of abstraction than the object class in the lower hierarchy level;
a display control unit configured to display, on a display, at a first magnification rate or a second magnification rate higher than the first magnification rate, the specific image from which the plurality of object classes including the at least one object class in the first hierarchy level and the at least one object class in the second hierarchy level has been detected;
a selection unit configured to select a specific hierarchy level on the basis of a predetermined selection criterion, wherein when the display magnification rate of the specific image is the first magnification rate, the selection unit selects the first hierarchy level as the specific hierarchy level, and when the display magnification rate of the specific image is the second magnification rate higher than the first magnification rate, the selection unit selects the second hierarchy level lower than the first hierarchy level as the specific hierarchy level; and
a notification unit configured to notify a user of one or more of the plurality of object classes, with priority given to an object class belonging to the specific hierarchy level,
wherein in a case where the plurality of object classes organized hierarchically, which has been detected from the specific image, is obtained, the notification unit notifies the user of the object class belonging to the specific hierarchy level selected by the selection unit, with priority given to the object class belonging to the specific hierarchy level.

8. The notification apparatus according to claim 7, wherein the selection unit further selects the specific hierarchy level on the basis of a user operation.

9. The notification apparatus according to claim 7, wherein
the display control unit is configured to display a thumbnail image of the specific image on the display, and
wherein when the thumbnail image is displayed on the display, the selection unit selects a highest hierarchy level as the specific hierarchy level.

10. The notification apparatus according to claim 9, wherein when the thumbnail image is displayed on the display, the notification unit notifying the user of one or more of the plurality of object classes includes displaying, near the thumbnail image on the display, information indicating the object class for notification.

11. The notification apparatus according to claim 7, wherein the at least one processor and/or at least one circuit further functions as:
a detection unit configured to detect the plurality of object classes from the specific image.

12. The notification apparatus according to claim 7, wherein when a number of the plurality of object classes is less than or equal to a threshold, the notification unit notifies the user of all of the plurality of object classes.

13. The notification apparatus according to claim 7, wherein the obtainment unit utilizes a convolutional neural network for the detection and organization of the plurality of object classes.

14. A notification method executed by an image capturing apparatus, comprising:
carrying out continuous shooting;
detecting, from a specific image obtained through the continuous shooting, a specific plurality of object classes, the object classes being organized hierarchically in a plurality of hierarchy levels according to a hierarchical structure in which an object class in a higher hierarchy level contains an object class in a lower hierarchy level, wherein the object class in the higher hierarchy level has a higher level of abstraction than the object class in the lower hierarchy level;
selecting, during the continuous shooting, a specific hierarchy level from the plurality of hierarchy levels on the basis of a predetermined selection criterion; and
notifying, during the continuous shooting, a user of one or more of the specific plurality of object classes detected from the specific image, with priority given to an object class belonging to the specific hierarchy level selected from the plurality of hierarchy levels,
wherein in a case where the specific plurality of object classes organized hierarchically is detected from the specific image, the notifying step notifies the user of the object class belonging to the specific hierarchy level selected in the selecting step, with priority given to the object class belonging to the specific hierarchy level,
wherein the specific hierarchy level is further selected on the basis of a user operation,
when an operation for zooming to a wide-angle side has been made during the continuous shooting, a hierarchy level higher than a hierarchy level selected a previous time is selected as the specific hierarchy level; and
when an operation for zooming to a telephoto side has been made during the continuous shooting, a hierarchy level lower than a hierarchy level selected a previous time is selected as the specific hierarchy level.

15. A notification method executed by a notification apparatus, comprising:
obtaining a plurality of object classes organized hierarchically according to a hierarchical structure in which an object class in a higher hierarchy level contains an object class in a lower hierarchy level, the plurality of object classes having been detected from a specific image regardless of a display magnification rate of the specific image and including at least one object class in a first hierarchy level and at least one object class in a second hierarchy level lower than the first hierarchy level, wherein the object class in the higher hierarchy level has a higher level of abstraction than the object class in the lower hierarchy level;

displaying, on a display at a first magnification rate or a second magnification rate higher than the first magnification rate, the specific image from which the plurality of object classes including the at least one object class in the first hierarchy level and the at least one object class in the second hierarchy level has been detected;

selecting a specific hierarchy level on the basis of a predetermined selection criterion, wherein when the display magnification rate of the specific image is the first magnification rate, the first hierarchy level is selected as the specific hierarchy level, and when the display magnification rate of the specific image is the second magnification rate higher than the first magnification rate, the second hierarchy level lower than the first hierarchy level is selected as the specific hierarchy level; and notifying a user of one or more of the plurality of object classes, with priority given to an object class belonging to the specific hierarchy level, wherein in a case where the plurality of object classes organized hierarchically, which has been detected from the specific image, is obtained, the notifying step notifies the user of the object class belonging to the specific hierarchy level selected in the selecting step, with priority given to the object class belonging to the specific hierarchy level.

16. A non-transitory computer-readable storage medium which stores a program for causing a computer to execute a notification method comprising:

carrying out continuous shooting;

detecting, from a specific image obtained through the continuous shooting, a specific plurality of object classes, the object classes being organized hierarchically in a plurality of hierarchy levels according to a hierarchical structure in which an object class in a higher hierarchy level contains an object class in a lower hierarchy level, wherein the object class in the higher hierarchy level has a higher level of abstraction than the object class in the lower hierarchy level;

selecting, during the continuous shooting, a specific hierarchy level from the plurality of hierarchy levels on the basis of a predetermined selection criterion; and notifying, during the continuous shooting, a user of one or more of the specific plurality of object classes detected from the specific image, with priority given to an object class belonging to the specific hierarchy level selected from the plurality of hierarchy levels, wherein in a case where the specific plurality of object classes organized hierarchically is detected from the specific image, the notifying step notifies the user of the object class belonging to the specific hierarchy level selected in the selecting step, with priority given to the object class belonging to the specific hierarchy level, wherein the specific hierarchy level is further selected on the basis of a user operation, when an operation for zooming to a wide-angle side has been made during the continuous shooting, a hierarchy level higher than a hierarchy level selected a previous time is selected as the specific hierarchy level; and when an operation for zooming to a telephoto side has been made during the continuous shooting, a hierarchy level lower than a hierarchy level selected a previous time is selected as the specific hierarchy level.

17. A non-transitory computer-readable storage medium which stores a program for causing a computer to execute a notification method comprising:

obtaining a plurality of object classes organized hierarchically according to a hierarchical structure in which an object class in a higher hierarchy level contains an object class in a lower hierarchy level, the plurality of object classes having been detected from a specific image regardless of a display magnification rate of the specific image and including at least one object class in a first hierarchy level and at least one object class in a second hierarchy level lower than the first hierarchy level, wherein the object class in the higher hierarchy level has a higher level of abstraction than the object class in the lower hierarchy level;

displaying, on a display, at a first magnification rate or a second magnification rate higher than the first magnification rate, the specific image from which the plurality of object classes including the at least one object class in the first hierarchy level and the at least one object class in the second hierarchy level has been detected;

selecting a specific hierarchy level on the basis of a predetermined selection criterion, wherein when the display magnification rate of the specific image is the first magnification rate, the first hierarchy level is selected as the specific hierarchy level, and when the display magnification rate of the specific image is the second magnification rate higher than the first magnification rate, the second hierarchy level lower than the first hierarchy level is selected as the specific hierarchy level; and notifying a user of one or more of the plurality of object classes, with priority given to an object class belonging to the specific hierarchy level, wherein in a case where the plurality of object classes organized hierarchically, which has been detected from the specific image, is obtained, the notifying step notifies the user of the object class belonging to the specific hierarchy level selected in the selecting step, with priority given to the object class belonging to the specific hierarchy level.

* * * * *